July 11, 1950  J. M. MILLER  2,514,781
TIRE APPLYING DEVICE

Filed Nov. 13, 1947  2 Sheets-Sheet 1

Inventor
John M. Miller

By Clarence A. O'Brien
and Harvey B. Jacobson
Attorneys

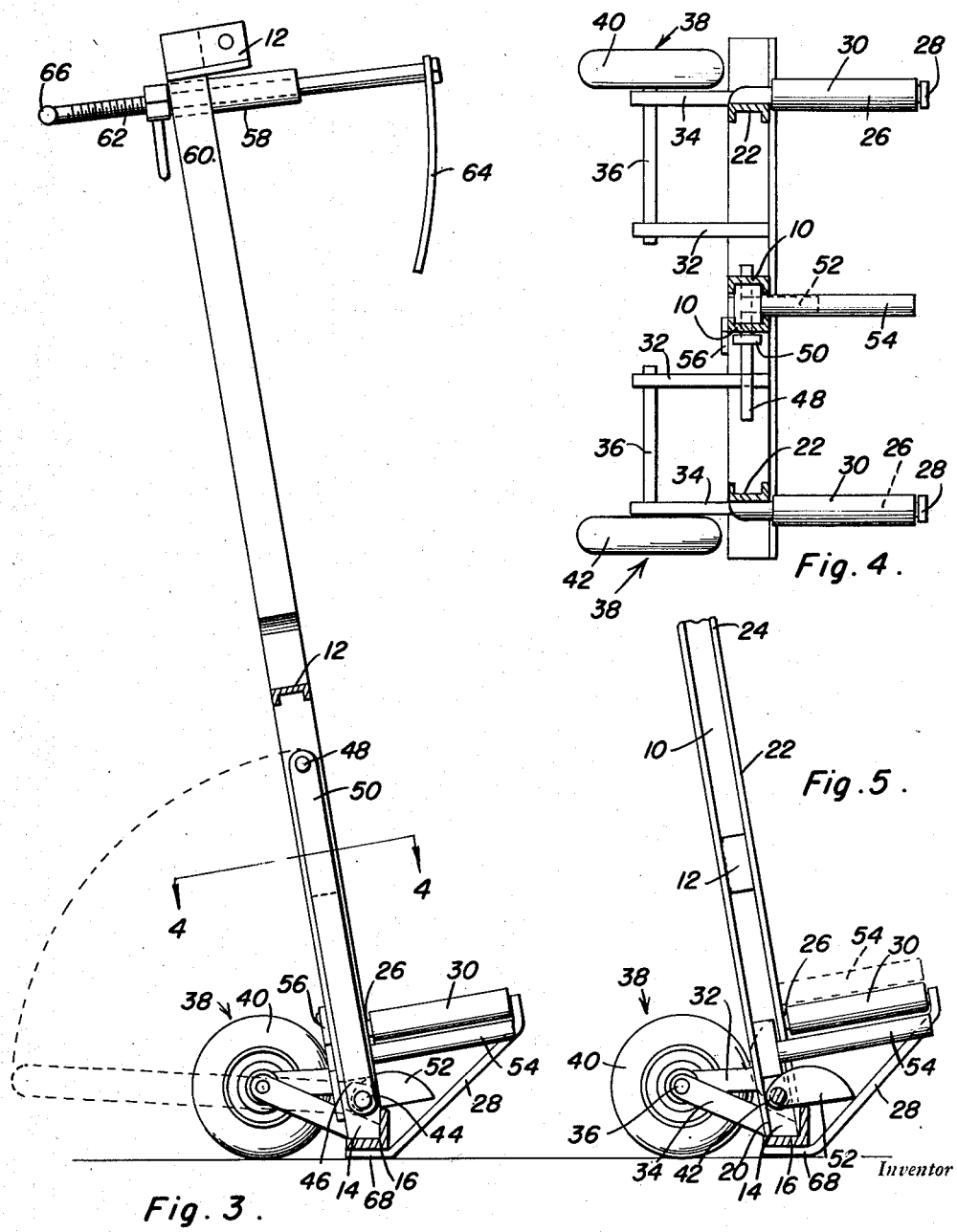

Patented July 11, 1950

2,514,781

UNITED STATES PATENT OFFICE 2,514,781

TIRE APPLYING DEVICE

John M. Miller, Blytheville, Ark.

Application November 13, 1947, Serial No. 785,720

4 Claims. (Cl. 214—65.4)

This invention relates to new and useful improvements in tire applying devices and the primary object of the present invention is to provide a device for conveying a tire into position on an axle and including novel and improved means for lifting the tire to a position where the tire rim will fit on the bolts on the vehicle wheel.

Another important object of the present invention is to provide a tire applying device so designed as to facilitate the same to be quickly and readily applied in a fixed position relative to the bottom of a truck to support a spare tire in an easily accessible position.

A further object of the present invention is to provide a tire applying device including a wheeled frame and having handle means facilitating the convenient movement of a vehicle tire to a desired point for use or repair.

A still further aim of the present invention is to provide a tire applying device that is simple and practical in construction, strong and reliable in use, small and compact in structure, relatively inexpensive to manufacture, and otherwise well adapted for the purposes for which the same is intended.

Other objects and advantages reside in the details of construction and operation as more fully hereinafter described and claimed, reference being had to the accompanying drawings forming part hereof, wherein like numerals refer to like parts throughout, and in which—

Figure 3 is a longitudinal vertical sectional view taken substantially on the plane of section line 3—3 of Figure 2, and with dotted lines showing the pivotal movement of the actuating lever;

Figure 4 is a transverse sectional view taken substantially on the plane of section line 4—4 of Figure 3; and, Figure 5 is a fragmentary longitudinal vertical sectional view taken substantially on the plane of section line 5—5 of Figure 2.

Figure 1:
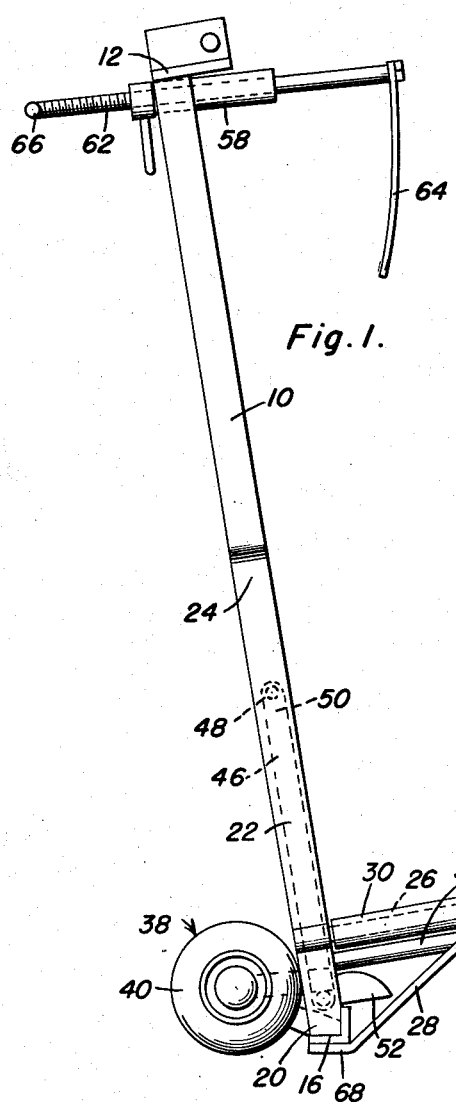
Figure 1 is a side elevational view of the present invention in a self-supported or standing position.
Figure 2:
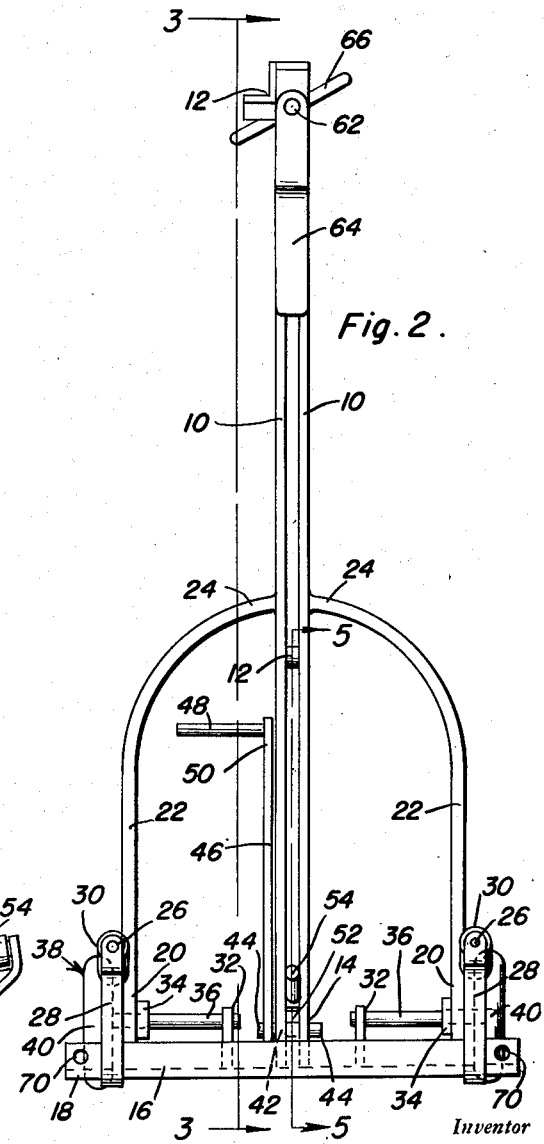
Figure 2 is a front elevational view of Figure 1.

Referring now to the drawings in detail, wherein for the purpose of illustration, there is disclosed a preferred embodiment of the present invention, the numeral 10 represents a pair of spaced parallel preferably channel-shaped members or arms that are retained in spaced apart relationship by rigid cross members or plates 12. The arms 10 form a handle or support whereby the instant structure may be conveniently moved.

Fixedly secured by welding or the like to the lower ends 14 of the arms 10, is a rigid main support 16, the ends 18 of which project outwardly from the arms 10 and are rigidly secured to the lower ends 20 of a pair of preferably parallel side arms or supports 22. The upper ends 24 of the side arms 22 curve inwardly toward each other and are welded or otherwise fixedly secured to the arms 10, at substantially the longitudinal center of said arms 10.

The numeral 26 represents a pair of rigid shafts that are fixed to the ends 20 of the side arms 22. These shafts 26 project outwardly from the arms 22, at right angles to the longitudinal axes of the arms 10. The shafts 26 are supported in this position by inclined support strips 28 that are rigidly secured to the main support 16.

Rotatably mounted on the shafts 26, are rollers or sleeves 30 that frictionally engage the lower periphery of a suitable vehicle tire (not shown) with the outer face or side wall of the tire bearing against the arms 10 and the side arms 22.

Projecting rearwardly from the arms 10, and at right angles to the longitudinal axes of arms 10, is a pair of spaced parallel inner bearing ears or supports 32 that are rigidly secured to the main support 16. These bearing ears 32 co-operate with further bearing ears 34 that are rigidly secured to the side arms 22, in order to support axles 36, on which there are suitably mounted wheels 38 having preferably rubberized treads or tires 40.

Rotatably mounted between the arms 10, adjacent their lower ends 14, is a shaft 42 the ends 44 of which project outwardly from the arms 10. Fixed on this shaft 42 is one end of a lever 46 having a foot engaging angular bar 48 at its free end 50. Rigidly secured on the shaft 42 for longitudinal movement between the arms 10, is a cam 52 that engages the lower periphery of a slide member 53 that is disposed between the arms 10. A preferably cylindrical support arm 54 is secured to the slide member 53 and includes an angulated shank portion 56 that frictionally bears against a stop or one of the arms 10, to limit the downward sliding movement of the arm 54. Normally, this cylindrical support arm 54 is spaced at right angles to the longitudinal axes of arms 10 and below the lower periphery of a tire that is supported on the sleeves 30.

An internally threaded sleeve 58 is fixed between the arms 10, adjacent their upper ends 60, and this sleeve 58 receivably engages a screw threaded rod 62 supporting a flexible bearing strip or arm 64 that may be adjusted relative to the arms 10 to bear against the inner face or side wall of a tire, to retain the said tire in position to arms 10 and 22, and the sleeves 30.

Fixed on the rod 62, is a handle 66 whereby the arm 64 may be adjusted and so that the arms 10 may be retained in a vertically inclined position when the device is being moved on the wheels 38. The device is then pushed to a position adjacent an axle of a truck or vehicle with the tire retained on the device to be applied. By tipping the device forwardly, the same will remain in a substantially vertical or inclined position and will be supported in this position by the ends 68 of the support strips 28 that are fixed to the main support 16. To raise a tire relative to the vehicle axle (not shown) it is merely necessary to depress the foot engaging portion 48 of the lever 46, which will pivot the cam 52 upwardly to engage and raise the cylindrical support arm 54, thus effecting a raising of the tire relative to the support sleeves 30.

It should be noted, that the main support 16 is provided with openings 70 adjacent each end, facilitating the same to engage suitable fasteners for attaching a device to the bottom of a truck or any suitable supporting element of a truck such as a truck bed.

In view of the foregoing description taken in conjunction with the accompanying drawings it is believed that a clear understanding of the construction, operation and advantages of the device will be quite apparent to those skilled in this art. A more detailed description is accordingly deemed unnecessary.

It is to be understood, however, that even though there is herein shown and described a preferred embodiment of the invention the same is susceptible to certain changes fully comprehended by the spirit of the invention as herein described and the scope of the appended claims.

Having described the invention, what is claimed as new is:

1. A wheel applying device comprising a wheeled frame including a handle, a plurality of rollers carried by said frame for normally supporting a tire, means carried by said handle for retaining a tire positioned against said frame, a movable support engageable with a tire, and lever means for actuating said movable support to raise and lower a tire relative to said rollers said lever means including a rotatable cam engaging said movable support.

2. A wheel applying device comprising a wheeled frame including a handle, a plurality of rollers carried by said frame for normally supporting a tire, means carried by said handle for retaining a tire positioned against said frame, a movable support engageable with a tire, and lever means for actuating said movable support to raise and lower a tire relative to said rollers, wherein said movable support includes a slidable member carried by said handle, and said lever means includes a cam frictionally engaging said slidable member.

3. A wheel applying device comprising a wheel frame including a pair of channel members forming a handle, a plurality of rollers carried by said frame for supporting a tire, means carried by said handle for retaining a tire against the frame, a slidable arm carried by said channel members and normally disposed beneath said rollers, a vertically swingable cam disposed between said channel members and engaging said slidable arm, and means connected to the cam for rotating the cam to raise the slidable arm to a predetermined position above the rollers.

4. A wheel applying device comprising a wheel frame including a pair of channel members forming a handle, a plurality of rollers carried by said frame for supporting a tire, means carried by said handle for retaining a tire against the frame, a slidable arm carried by said channel members and normally disposed between said channel members and engaging said slidable arm, and means connected to the cam for rotating the cam to raise the slidable arm to a predetermined position above the rollers, said means carried by said handle for retaining a tire against the frame including an internal sleeve secured to and projecting laterally from said channel members, a screw threaded rod receivably engaged in said sleeve, and a flexible bearing strip fixed to one end of said rod.

JOHN M. MILLER.

REFERENCES CITED

The following references are of record in the file of this patent:

UNITED STATES PATENTS

| Number | Name | Date |
|---|---|---|
| 1,523,486 | Manley | Jan. 20, 1925 |
| 2,217,898 | Gemmill | Oct. 15, 1940 |
| 2,345,729 | Claus et al. | Apr. 4, 1944 |

FOREIGN PATENTS

| Number | Country | Date |
|---|---|---|
| 642,021 | France | Feb. 20, 1937 |
| 118,923 | Australia | July 31, 1943 |